United States Patent
Lin et al.

(10) Patent No.: US 7,700,694 B2
(45) Date of Patent: Apr. 20, 2010

(54) CATALYST COMPOSITION AND METHOD FOR HYDROGENATING A POLYMER HAVING A CONJUGATED DIENE

(75) Inventors: Fu Lin, Kaohsiung (TW); Chih-Kuang Tsai, Kaohsiung (TW); Shun-An Liu, Kaohsiung (TW); Jing-Cherng Tsai, Chiayi County (TW)

(73) Assignee: TSRC Corporation, Ta-She, Kaohsiung (TW)

( * ) Notice: Subject to any disclaimer, the term of this patent is extended or adjusted under 35 U.S.C. 154(b) by 1006 days.

(21) Appl. No.: 11/413,326

(22) Filed: Apr. 28, 2006

(65) Prior Publication Data

US 2007/0254802 A1    Nov. 1, 2007

(51) Int. Cl.
| | |
|---|---|
| C08F 36/00 | (2006.01) |
| C08F 8/42 | (2006.01) |
| C08F 4/44 | (2006.01) |
| C08F 30/08 | (2006.01) |
| C08C 19/00 | (2006.01) |

(52) U.S. Cl. ............ 525/331.9; 525/338; 525/342; 526/114; 526/124.1; 526/279; 502/152

(58) Field of Classification Search ............ 525/331.9, 525/338, 342; 526/114, 124, 279; 502/152
See application file for complete search history.

(56) References Cited

U.S. PATENT DOCUMENTS

| | | | |
|---|---|---|---|
| 4,980,421 | A | 12/1990 | Teramoto et al. |
| 5,244,980 | A | 9/1993 | Gibler et al. |
| 5,270,274 | A | 12/1993 | Hashiguchi et al. |
| 5,886,108 | A | 3/1999 | Miyamoto et al. |
| 5,948,869 | A | 9/1999 | Vallieri et al. |
| 5,985,995 | A | 11/1999 | Calle et al. |
| 6,313,230 | B1 | 11/2001 | Tsai et al. |
| 2004/0082727 | A1 * | 4/2004 | Lin et al. ........... 525/331.9 |
| 2006/0041079 | A1 | 2/2006 | Lin et al. |

FOREIGN PATENT DOCUMENTS

| | | |
|---|---|---|
| CN | 1130382 * | 12/2003 |
| CN | PRC 00107660.4 | 12/2003 |
| EP | 0434469 A2 | 6/1991 |
| EP | 0544304 A | 6/1993 |
| EP | 0816382 A1 | 1/1998 |

* cited by examiner

*Primary Examiner*—Ling-Siu Choi
(74) *Attorney, Agent, or Firm*—Volpe and Koenig, P.C.

(57) ABSTRACT

A catalyst composition and a method for hydrogenating a polymer having a conjugated diene are provided. The catalyst composition includes (a) a first composition having one of a bis(cyclopendienyl, fluorenyl, indenyl and derivatives thereof) titanium compound and a mixture thereof; (b) a second composition having one selected from the group consisting of a first compound of a formula (II), a second compound of a formula (III) and a mixture thereof:

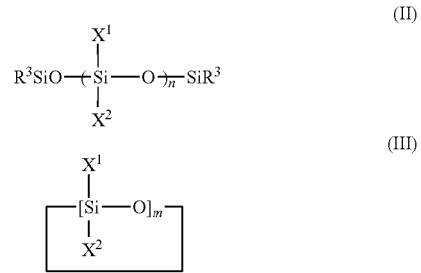

wherein the formula (II) has a chain structure, the formula (III) has a cyclic structure, the R is $C_1$~$C_{12}$ alkyl, the $X^1$ and $X^2$ are ones selected from the group consisting of $C_1$~$C_{12}$ alkyl, $C_1$~$C_{12}$ cycloalkoxy, aryl, $C_1$~$C_{12}$ alkyl aryl and carbonyl, and n>1 and m>2; and (c) a third composition having an organic metallic compound.

37 Claims, 2 Drawing Sheets

CATALYST COMPOSITION AND METHOD FOR HYDROGENATING A POLYMER HAVING A CONJUGATED DIENE

FIELD OF THE INVENTION

The present invention relates to a method for hydrogenating a polymer having a conjugated diene, and more particularly to a method for hydrogenating a polymer having a conjugated diene with the use of a special catalyst composition.

BACKGROUND OF THE INVENTION

Generally, polymers obtained by polymerizing or copolymerizing conjugated dienes are widely utilized for commercial purposes. These polymers have residual unsaturated double bonds in their polymer chains. These unsaturated double bonds are advantageously utilized for vulcanization and yet have a disadvantage in that they lack the stability to resist weather conditions, oxidation and ozone due to the presence of a large amount of unsaturated double bonds. Such disadvantage is more severe for copolymers of conjugated dienes and vinyl aromatic hydrocarbons used as thermoplastic elastomers. Such disadvantage is even more severe when the copolymers of conjugated dienes and vinyl aromatic hydrocarbons are used as modifiers and transparent impact-resistant materials for styrenic resins and olefinic resins. In the field of exterior materials to which such properties are indispensable, the copolymers find limited utility because of this drawback.

This deficiency in stability could be notably improved by hydrogenating such conjugated diene polymers and consequently eliminating the unsaturated double bonds persisting in the polymer chain thereof. Numerous methods have been so far proposed for hydrogenating conjugated diene polymers in the presence of suitable and effective hydrogenation catalysts. Typical hydrogenation catalysts could be classified into two types:

(1) heterogeneous catalysts having compounds of nickel, platinum, or palladium deposited on supports such as active carbon, silica, alumina, or calcium carbonate;

(2) homogenous catalysts, for example, Ziegler-type catalysts obtained by causing an organic acid salt of nickel, cobalt, iron, or chromium to react with a reducing agent such as an organic aluminum compound, and organometallic compounds such as Ru, Rh, Ti, or La compound.

Although widely used in industry, heterogeneous catalysts have lower activity than the homogeneous catalyst. Therefore, it requires a large amount of heterogeneous catalyst and the hydrogenation must be conducted at higher temperature and pressure. In contrast, less homogeneous catalyst is needed and the hydrogenation could be conducted at mild temperature and pressure.

Hydrogenation using a heterogeneous catalyst is described as follows. First, the polymer to be hydrogenated is dissolved in a suitable solvent. Then, the polymer is brought into contact with hydrogen in the presence of a heterogeneous catalyst. When the polymer is hydrogenated, contact between the polymer and the catalyst is difficult because of the influence of the viscosity of the reaction system and the influence of stereohindrance of the polymer. Moreover, the hydrogenation requires higher temperature and pressure, and hence, decomposition of the polymer and the gelation of the reaction system tend to occur. Also, in the hydrogenation of a copolymer of a conjugated diene with a vinyl aromatic hydrocarbon, even hydrogenation of the aromatic ring portion takes place due to high temperature and pressure, and it has been difficult to selectively hydrogenate only the double bonds in the conjugated diene portion. In addition, since the polymer is strongly adsorbed on the heterogeneous catalyst, it is impossible to completely remove the catalyst from the hydrogenated polymer solution.

On the other hand, with the homogeneous catalyst, the hydrogenation proceeds normally in a homogeneous system. Therefore, compared with the heterogeneous catalyst, the homogeneous catalyst is generally high in activity and a small amount of catalyst enables a satisfactory hydrogenation to be effected at low temperature and low pressure. In addition, when appropriate hydrogenation conditions are selected, it is possible to preferentially hydrogenate the conjugated diene portion of a copolymer of a conjugated diene with a vinyl aromatic hydrocarbon, while not hydrogenating the aromatic ring portion. Nevertheless, the catalyst could not be removed from the product easily since the amount of the catalyst used in the homogeneous system is higher (which needs a higher concentration of the catalyst), thereby making the product instable and exhausting the energy for removing the catalyst.

Conventional processes for hydrogenation of a conjugated diene polymer using a homogeneous catalyst are summarized below.

U.S. Pat. No. 4,980,421 discloses a process for hydrogenating a conjugated diene polymer using a hydrogenation catalyst including a bis(cyclopentadienyl)titanium(+4) compound, an alkoxy lithium compound, and an organometallic compound (such as aluminum, zinc, or magnesium compound). This hydrogenation catalyst has high activity and could be used under mild conditions.

U.S. Pat. No. 5,270,274 discloses a hydrogenation catalyst composition including a bis(cyclopentadienyl)titanium(+4) compound, a polarized carbonyl group or epoxy group-containing compound, and an organic lithium compound. The unsaturated double bonds in the conjugated diene polymer could be preferentially hydrogenated. The hydrogenated polymer has superior physical properties and weather resistance.

U.S. Pat. No. 5,244,980 discloses a hydrogenation process including terminating a living conjugated diene polymer with hydrogen, and then adding an organo alkali metal and a Tebbe's catalyst.

U.S. Pat. No. 5,886,108 discloses hydrogenating a living conjugated diene polymer using a Tebbe's catalyst prepared by the reaction of a bis(cyclopentadienyl)titanium(+4) compound and trimethyl aluminum.

U.S. Pat. No. 5,985,995 discloses a process for producing a hydrogenated rubber, which allows an easy and effective deactivation of the living polymer before the hydrogenation step. The deactivation of living polymer is carried out using alkyl silicon halide or alkyl tin halide. The catalyst used in the hydrogenation of the deactivated polymer could be bis(cyclopentadienyl)Ti(PhOCH3)2.

U.S. Pat. No. 5,948,869 discloses a catalyst composition effective in the selective hydrogenation of conjugated diene polymer, which includes a bis(cyclopentadienyl)titanium(+4) compound, an alkyl zinc or alkyl magnesium, and a modifier of ethers or aromatic hydrocarbon compounds.

European Patent No. 0434469 A2 discloses a catalyst composition for hydrogenating a conjugated diene polymer, which includes a bis(cyclopentadienyl)titanium compound, an organoaluminum compound or organomagesium compound, and a polar compound of ether or ketone.

European Patent No. 0544304A discloses a catalyst composition including a bis(cyclopentadienyl) transition metal compound, a polarized compound of carbonyl group-containing compound or epoxy group-containing compound, an organic lithium compound, and a reducing organometal compound such as aluminum compound, zinc compound, or magnesium compound, for example, triethyl aluminum.

U.S. Pat. No. 6,313,230 and P. R. C. Patent No. 00107660.4 disclose a catalyst composition effective in the selective hydrogenation of conjugated diene polymer, which includes a bis(cyclopentadienyl)titanium(+4) compound and a Si—H function group compound, and which could further improve the hydrogenation efficiency. The highest temperature for hydrogenating reaction in the embodiments of this two prior arts are 60° C., and thus the activity of the catalyst composition would be reduced. Therefore, a large number of reaction heat need to be removed while hydrogenating, so as to improve the hydrogenation efficiency. Besides, the catalyst composition could not be stored in Nitrogen for a long period of time, and the activity of the catalyst composition would be decayed. The catalyst composition must be used in a very short period of time after combining so as to control the hydrogenation efficiency well. Thus the catalyst composition is not suitable for continuous producing processes.

According to the above, although many catalyst compositions had been used for hydrogenating a polymer having a conjugated diene, the present invention further provides a stable and easy-to-store catalyst composition and a method for hydrogenating a polymer having a conjugated diene. The polymer could be hydrogenated successfully using a small amount of the catalyst composition with a relatively high activity at a higher temperature. Therefore, the catalyst composition of the present invention is suitable for mass production and greatly enhances economical efficiency.

For overcoming the mentioned disadvantages of the prior arts, a catalyst composition and a method for hydrogenating a polymer having a conjugated diene are provided in the present invention.

SUMMARY OF THIS INVENTION

The main aspect of the present invention is to provide a catalyst composition and a method for successful hydrogenation of a conjugated diene polymer using a small amount of a hydrogenation catalyst composition with relatively high activity. Since the catalyst concentration is very low, there is no need to remove the catalyst from the hydrogenated polymer, which greatly enhances economical efficiency. Moreover, the hydrogenation of the present invention is very rapid and exhibits good reproducibility over a wide range of temperatures and pressures.

As the above, the present invention is to provide a stable and easy-to-store catalyst composition and a method for hydrogenating a polymer having a conjugated diene.

In accordance with a first aspect of the present invention, the catalyst composition for hydrogenating a polymer having a conjugated diene includes:

(a) a first composition having one of a titanium compound of a formula (I) and a mixture thereof:

(I)

wherein:
R$^1$ and R$^2$ are identical or different and are ones selected from the group consisting of hydrogen, halogen, C$_1$~C$_8$ alkyl, C$_1$~C$_8$ alkoxy, C$_6$~C$_{12}$ cycloalkyl, phenyl, phenoxy, C$_7$~C$_{10}$ arylalkoxy, C$_7$~C$_{10}$ arylalkyl, carboxy, —CH$_2$P(phenyl)$_2$, —CH$_2$Si(C$_1$~C$_5$ alkyl)$_3$ and —P(phenyl)$_2$; and A is one selected from the group consisting of cyclopentadienyl, fluorenyl, indenyl and derivatives thereof;

(b) a second composition having one selected from the group consisting of a first compound of a formula (II), a second compound of a formula (III) and a mixture thereof:

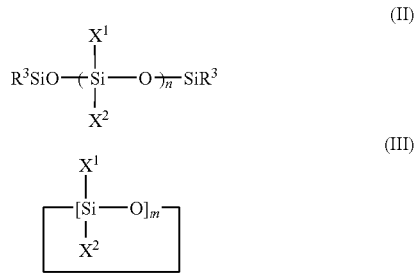

wherein the formula (II) has a chain structure, the formula (III) has a cyclic structure, the R is C$_1$~C$_{12}$ alkyl, the X$^1$ and X$^2$ are ones selected from the group consisting of C$_1$~C$_{12}$ alkyl, C$_1$~C$_{12}$ cycloalkoxy, aryl, C$_1$~C$_{12}$ alkyl aryl and carbonyl, and n>1 and m>2; and (c) a third composition having an organic metallic compound.

The organic metallic compound includes R$^4$Li, R$^4$R$^5$Mg, R$^4$R$^5$R$^6$Al, a mixture of R$^4$Li and R$^4$R$^5$Mg and a mixture of R$^4$Li and R$^4$R$^5$R$^6$Al, wherein the R$^4$ is one selected from the group consisting of C$_1$~C$_{12}$ alkyl, C$_1$~C$_{12}$ alkoxy, C$_6$~C$_{12}$ aryl, C$_6$~C$_{12}$ alkoxy and hydrogen, and the R$^5$ and R$^6$ are identical or different and are ones selected from the group consisting of C$_1$~C$_{12}$ alkyl, C$_6$~C$_{12}$ aryl, hydrogen and halogen; but the R$^4$, R$^5$ and R$^6$ are not methyl at the same time.

Preferably, a molar ratio of the second composition to the first composition and a molar ratio of the third composition to the first composition are from 0.1 to 50.

The catalyst composition of the present invention is a stable and easy-to-store catalyst composition. The second composition of the formula (II) or the formula (III) could be combined with the first composition and the third composition to increase the overall hydrogenation efficiency and stabilize the activity of other catalysts. Therefore, when the catalyst composition of the present invention is added to the conjugated diene polymer, it could be stored for a long period of time and maintains good catalytic activity stability and reproducibility.

In accordance with a second aspect of the present invention, a method for hydrogenating a polymer having a conjugated diene is provided. The method includes a step of hydrogenation of dissolving the polymer in one of an inert organic solvent and an inert organic solvent which includes a portion of ether and amine polar compound to be reacted with a hydrogen in a presence of a hydrogenation catalyst composition so as to selectively hydrogenate an unsaturated double bond in the polymer.

Preferably, the polymer of the present invention is one of a conjugated diene homopolymer and a conjugated diene copolymer, and the hydrogenation is performed at a temperature ranged from 0° C. to 250° C. and at a hydrogen pressure ranged from 1 to 150 kg/cm$^2$. Furthermore, the first composition is present in an amount of 0.001 to 50 millimoles based on 100 g of the polymer.

The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1:
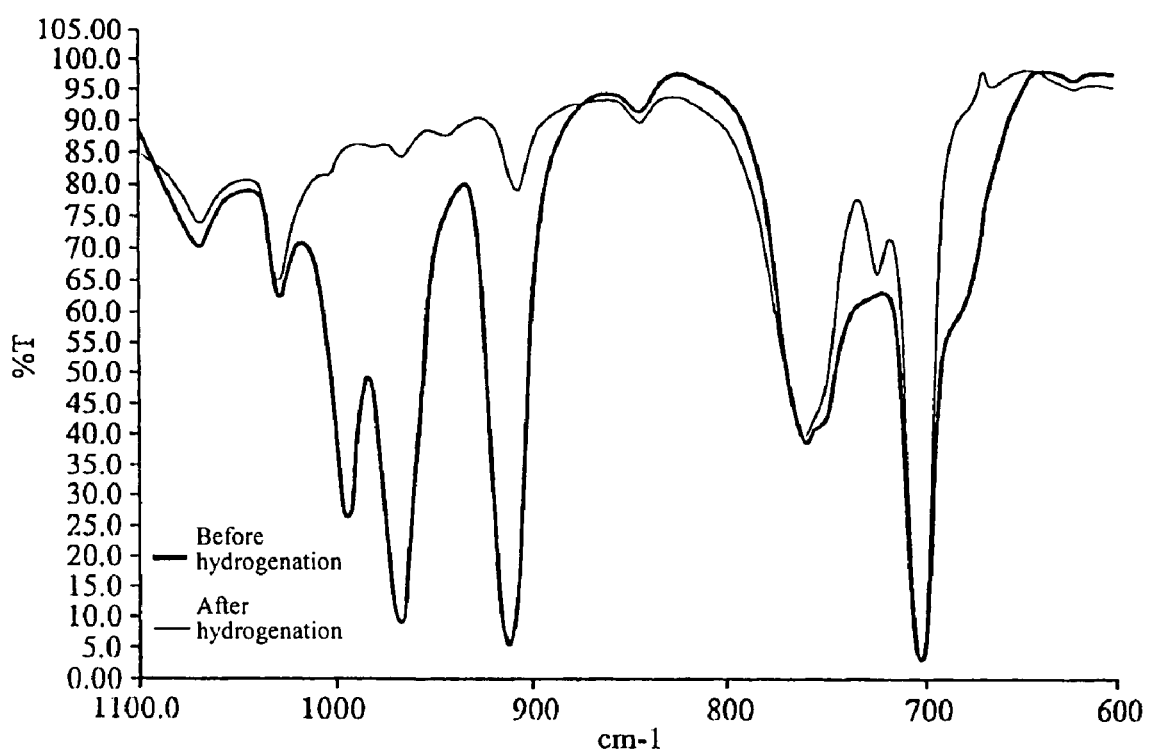
FIG. 1 is the IR spectrum schematically showing the SBS copolymer of Example 2 of the present invention before and after hydrogenation.

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

The present invention provides the catalyst compositions (a), (b) and (c) for hydrogenating a polymer having a conjugated diene, and the catalyst composition (a) is a first composition having one of a titanium compound of a formula (I) and a mixture thereof:

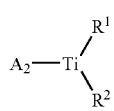

(I)

wherein:

$R^1$ and $R^2$ are identical or different and are ones selected from the group consisting of hydrogen, halogen, $C_1$~$C_8$ alkyl, $C_1$~$C_8$ alkoxy, $C_6$~$C_{12}$ cycloalkyl, phenyl, phenoxy, $C_7$~$C_{10}$ arylalkoxy, $C_7$~$C_{10}$ arylalkyl, carboxy, —$CH_2P(phenyl)_2$, —$CH_2Si(C_1$~$C_5$ alkyl$)_3$ and —$P(phenyl)_2$; and A is one selected from the group consisting of cyclopendienyl, fluorenyl, indenyl and derivatives thereof.

For example, A could be $C_5R^7R^8R^9R^{10}R^{11}$ (cyclopentadienyl and derivatives thereof), wherein $R^7$, $R^8$, $R^9$, $R^{10}$ and $R^{11}$ could be the same or different and are ones selected from the group consisting of hydrogen, halogen, alkyl, aryl, carboxy, —$CH_2P(phenyl)_2$, —$CH_2Si(C_1$~$C_5$ alkyl$)_3$ and —$P(phenyl)_2$.

According to the catalyst composition (a) of the formula (I), a bis(cyclopentadienyl)titanium halide and a derivative thereof used suitably in the present invention could be one selected from the group consisting of bis(cyclopentadienyl) titanium difluorides, bis(cyclopentadienyl)titanium dichlorides, bis[(2,4-diphenylphosphinecyclopentadienyl)]titanium difluorides, bis[(2,4-dimethylphosphinecyclopentadienyl)]titanium difluorides, bis[(2,4-diphenylphosphinecyclopentadienyl)]titanium dichlorides, dimethoxy bis(cyclopentadienyl)titanium dichlorides, bis[(2,4-dimethylphosphinecyclopentadienyl)] titanium dichlorides, bis(cyclopentadienyl)titanium dibromides, bis[(2,4-diphenylphosphinecyclopentadienyl)]titanium dibromides, bis[(2,4-dimethylphosphinecyclopentadienyl)]titanium dibromides, bis(ethyl cyclopentadienyl)titanium dichlorides, bis(n-propylcyclopentadienyl)titanium dichlorides, bis(n-butylcyclopentadienyl)titanium dichlorides, bis(2-ethylhexylcyclopentadienyl)titanium dichlorides, (dimethylsilylene)-bis($\eta^5$-2,4-cyclopentadien-1-ylidene) and (ethylene)-bis($\eta^5$-2,4-cyclopentadien-1-ylidene).

According to the catalyst composition (a) of the formula (I), an organic carbohydrate of a bis(cyclopentadienyl)titanium and a derivative thereof used suitably in the present invention could be one selected from the group consisting of bis(cyclopentadienyl)titanium dimethyl, bis(cyclopentadienyl)titanium dimethoxy, bis(2,4-diphenylphosphinecyclopentadienyl)titanium dimethoxy, bis(2,4-dimethylphosphinecyclopentadienyl)titanium dimethoxy, bis (cyclopentadienyl)titanium diethoxy, bis(2,4-diphenylphosphinecyclopentadienyl)titanium diethoxy, bis (2,4-dimethylphosphinecyclopentadienyl)titanium diethoxy, bis(2,4-diphenylphosphinecyclopentadienyl)titanium diphenoxy and bis(2,4-dimethylphosphinecyclopentadienyl)titanium diphenoxy.

According to the catalyst composition (a) of the formula (I), a bifluorenyl titanium halide, a biindenyl titanium halide and a derivative thereof used suitably in the present invention could be one selected from the group consisting of bis(1-fluorenyl)titanium dichlorides, bis(1-indenyl)titanium dichlorides, bis(dimethoxylfluorenyl)titanium dichlorides, bis(fluorenyl)titanium difluorides, bis(indenyl)titanium difluorides, bis(dimethoxylfluorenyl)titanium difluorides, bis (fluorenyl)titanium dibromides, bis(indenyl)titanium dibromides, bis(dimethoxylfluorenyl)titanium and bis(indenyl) titanium dibromides.

According to the catalyst composition (a) of the formula (I), an organic carbohydrate selected from the group consisting of bifluorenyl titanium, biindenyl titanium and a derivative thereof used suitably in the present invention could be one selected from the group consisting of bis(fluorenyl)titanium dimethyl, bis(fluorenyl)titanium dimethoxy, bis(indenyl)titanium dimethoxy, bis(dimethoxylfluorenyl)titanium dimethoxy, bis(indenyl)titanium dimethoxy, bis(fluorenyl)titanium dimethanol, bis(indenyl)titanium dimethanol, bis (dimethoxylfluorenyl)titanium dimethanol, bis(indenyl)titanium dimethanol, bis(fluorenyl)titanium diphenoxy, bis (indenyl)titanium diphenoxy, bis(dimethoxylfluorenyl) titanium diphenoxy and bis(indenyl)titanium diphenoxy.

The derivative here indicates that there is a substituent on the indenyl, fluorenyl, or cyclopentadienyl ring, and the substituent could be one or more from methyl, methoxy, p-tert-butylphenyl, pentafluorophenyl, trifluorophenyl, difluorophenyl, or 3,5-(tert-butyl)-4-methoxyphenyl. A preferred example of the catalyst composition (a) is bis(cyclopentadienyl)titanium dichloride.

A second composition (b) having one selected from the group consisting of a first compound of a formula (II), a second compound of a formula (III) and a mixture thereof:

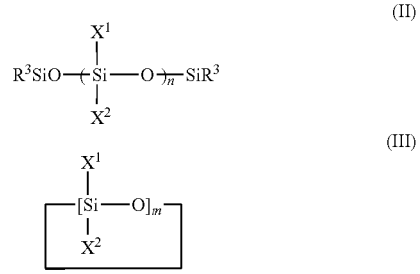

wherein the formula (II) has a chain structure, the formula (III) has a cyclic structure, the R is $C_1$~$C_{12}$ alkyl, the $X^1$ and $X^2$ are the same or different and are ones selected from the group consisting of $C_1$~$C_{12}$ alkyl, $C_1$~$C_{12}$ cycloalkoxy, aryl, $C_1$~$C_{12}$ alkyl aryl and carbonyl, and n>1 and m>2.

According to the present invention, the second composition (b) is a compound of the formula (II), and at least one of the $X^1$ and $X^2$ is one of $C_1$~$C_{12}$ alkyl and $C_1$~$C_{12}$ cycloalkoxy. For example, the second composition (b) whose $X^1$ and $X^2$ are $C_1$~$C_{12}$ alkyl could be one selected from the group consisting of poly(dimethyl)siloxane, poly(diethyl)siloxane, poly(dipropyl)siloxane, poly(dibutyl)siloxane, poly(diamyl)siloxane, poly(dihexyl)siloxane, poly(diheptyl)siloxane, poly(dioctyl)siloxane, poly(dinonyl)siloxane, poly(didecyl)siloxane, poly(methylethyl)siloxane, poly(methylpropyl)siloxane, poly(methylbutyl)siloxane, poly(methylamyl)siloxane, poly(methylhexyl)siloxane, poly(methylheptyl)siloxane, poly(methyloctyl)siloxane, poly(methylnonyl)siloxane, poly(methyldecyl)siloxane, poly(ethylpropyl)siloxane, poly(ethylbutyl)siloxane, poly(ethylamyl)siloxane, poly(ethylhexyl)siloxane, poly(ethylheptyl)siloxane, poly(ethyloctyl)siloxane, poly(ethylnonyl)siloxane, poly(ethyldecyl)siloxane, poly(propylbutyl)siloxane, poly(propylamyl)siloxane, poly(propylhexyl)siloxane, poly(propylheptyl)siloxane, poly(propyloctyl)siloxane, poly(propylnonyl)siloxane, poly(propyldecyl)siloxane, poly(butylamyl)siloxane, poly(butylhexyl)siloxane, poly(butylheptyl)siloxane, poly(butyloctyl)siloxane, poly(butylnonyl)siloxane, poly(butyldecyl)siloxane, poly(amylhexyl)siloxane, poly(amylheptyl)siloxane, poly(amyloctyl)siloxane, poly(amylnonyl)siloxane, poly(amyldecyl)siloxane, poly(hexylheptyl)siloxane, poly(hexyloctyl)siloxane, poly(hexylnonyl)siloxane, poly(hexyldecyl)siloxane, poly(heptyloctyl)siloxane, poly(heptylnonyl)siloxane, poly(heptyldecyl)siloxane, poly(octylnonyl)siloxane, poly(octyldecyl)siloxane, poly(nonyldecyl)siloxane, poly(methylepoxyl)siloxane, poly(ethylepoxyl)siloxane, poly(propylepoxyl)siloxane, poly(butylepoxyl)siloxane, poly(amylepoxyl)siloxane, poly(hexylepoxyl)siloxane and poly(heptylepoxyl)siloxane.

For example, the second composition (b) whose $X^1$ and $X^2$ are $C_1$~$C_{12}$ alkyl and $C_1$~$C_{12}$ cycloalkoxy respectively could be one selected from the group consisting of poly(dimethylepoxyl)siloxane, poly(diepoxylethyl)siloxane, poly(diepoxylpropyl)siloxane, poly(diepoxylbutyl)siloxane, poly(diepoxylamyl)siloxane, poly(diepoxylhexyl)siloxane, poly(diepoxylheptyl)siloxane, poly(diepoxyloctyl)siloxane, poly(diepoxylnonyl)siloxane, poly(diepoxyldecyl)siloxane, poly(methylepoxylmethyl)siloxane, poly(ethylepoxylmethyl)siloxane, poly(propylepoxylmethyl)siloxane, poly(butylepoxylmethyl)siloxane, poly(amylepoxylmethyl)siloxane, poly(hexylepoxylmethyl)siloxane, poly(heptylepoxylmethyl)siloxane, poly(octylepoxylmethyl)siloxane, poly(nonylepoxylmethyl)siloxane, poly(decylepoxylmethyl)siloxane, poly(methylepoxylethyl)siloxane, poly(ethylepoxylethyl)siloxane, poly(propylepoxylethyl)siloxane, poly(butylepoxylethyl)siloxane, poly(amylepoxylethyl)siloxane, poly(hexylepoxylethyl)siloxane, poly(heptylepoxylethyl)siloxane, poly(octylepoxylethyl)siloxane, poly(nonylepoxylethyl)siloxane, poly(decylepoxylethyl)siloxane, poly(methyl 1-epoxylpropyl)siloxane, poly(ethyl 1-epoxylpropyl)siloxane, poly(propyl 1-epoxylpropyl)siloxane, poly(butyl 1-epoxylpropyl)siloxane, poly(amyl 1-epoxylpropyl)siloxane, poly(hexyl 1-epoxylpropyl)siloxane, poly(heptyl 1-epoxylpropyl)siloxane, poly(octyl 1-epoxylpropyl)siloxane, poly(nonyl 1-epoxylpropyl)siloxane, poly(decyl 1-epoxylpropyl)siloxane, poly(methyl 2-epoxylpropyl)siloxane, poly(ethyl 2-epoxylpropyl)siloxane, poly(propyl 2-epoxylpropyl)siloxane, poly(butyl 2-epoxylpropyl)siloxane, poly(amyl 2-epoxylpropyl)siloxane, poly(hexyl 2-epoxylpropyl)siloxane, poly(heptyl 2-epoxylpropyl)siloxane, poly(octyl 2-epoxylpropyl)siloxane, poly(nonyl 2-epoxylpropyl)siloxane, poly(decyl 2-epoxylpropyl)siloxane, poly(methyl 1-epoxyln-butyl)siloxane, poly(ethyl 1-epoxyln-butyl)siloxane, poly(propyl 1-epoxyln-butyl)siloxane, poly(butyl 1-epoxyln-butyl)siloxane, poly(amyl 1-epoxyln-butyl)siloxane, poly(hexyl 1-epoxyln-butyl)siloxane, poly(heptyl 1-epoxyln-butyl)siloxane, poly(octyl 1-epoxyln-butyl)siloxane, poly(nonyl 1-epoxyln-butyl)siloxane, poly(decyl 1-epoxyln-butyl)siloxane, poly(methyl 2-epoxyln-butyl)siloxane, poly(ethyl 2-epoxyln-butyl)siloxane, poly(propyl 2-epoxyln-butyl)siloxane, poly(butyl 2-epoxyln-butyl)siloxane, poly(amyl 2-epoxyln-butyl)siloxane, poly(hexyl 2-epoxyln-butyl)siloxane, poly(heptyl 2-epoxyln-butyl)siloxane, poly(octyl 2-epoxyln-butyl)siloxane, poly(nonyl 2-epoxyln-butyl)siloxane, poly(decyl 2-epoxyln-butyl)siloxane, poly(methyl 1-epoxylsec-butyl)siloxane, poly(ethyl 1-epoxylsec-butyl)siloxane, poly(propyl 1-epoxylsec-butyl)siloxane, poly(butyl 1-epoxylsec-butyl)siloxane, poly(amyl 1-epoxylsec-butyl)siloxane, poly(hexyl 1-epoxylsec-butyl)siloxane, poly(heptyl 1-epoxylsec-butyl)siloxane, poly(octyl 1-epoxylsec-butyl)siloxane, poly(nonyl 1-epoxylsec-butyl)siloxane, poly(decyl 1-epoxylsec-butyl)siloxane, poly(methyl 2-epoxylsec-butyl)siloxane, poly(ethyl 2-epoxylsec-butyl)siloxane, poly(propyl 2-epoxylsec-butyl)siloxane, poly(butyl 2-epoxylsec-butyl)siloxane, poly(amyl 2-epoxylsec-butyl)siloxane, poly(hexyl 2-epoxylsec-butyl)siloxane, poly(heptyl 2-epoxylsec-butyl)siloxane, poly(octyl 2-epoxylsec-butyl)siloxane, poly(nonyl 2-epoxylsec-butyl)siloxane, poly(decyl 2-epoxylsec-butyl)siloxane, poly(methyl 1-epoxylisobutyl)siloxane, poly(ethyl 1-epoxylisobutyl)siloxane, poly(propyl 1-epoxylisobutyl)siloxane, poly(butyl 1-epoxylisobutyl)siloxane, poly(amyl 1-epoxylisobutyl)siloxane, poly(hexyl 1-epoxylisobutyl)siloxane, poly(heptyl 1-epoxylisobutyl)siloxane, poly(octyl 1-epoxylisobutyl)siloxane, poly(nonyl 1-epoxylisobutyl)siloxane, poly(decyl 1-epoxylisobutyl)siloxane, poly(methyl 2-epoxylisobutyl)siloxane, poly(ethyl 2-epoxylisobutyl)siloxane, poly(propyl 2-epoxylisobutyl)siloxane, poly(butyl 2-epoxylisobutyl)siloxane, poly(amyl 2-epoxylisobutyl)siloxane, poly(hexyl 2-epoxylisobutyl)siloxane, poly(heptyl 2-epoxylisobutyl)siloxane, poly(octyl 2-epoxylisobutyl)siloxane, poly(nonyl 2-epoxylisobutyl)siloxane, poly(decyl 2-epoxylisobutyl)siloxane, poly(methylepoxyltert-butyl)siloxane, poly(ethylepoxyltert-butyl)siloxane, poly(propylepoxyl tert-butyl)siloxane, poly(butylepoxyltert-butyl)siloxane, poly(amylepoxyltert-butyl)siloxane, poly(hexylepoxyltert-butyl)siloxane, poly(heptylepoxyltert-butyl)siloxane, poly(octylepoxyltert-butyl)siloxane, poly(nonylepoxyltert-butyl)siloxane and poly(decylepoxyltert-butyl)siloxane.

Furthermore, the second composition (b) of the formula (II) whose $X^1$ and $X^2$ are $C_1$~$C_{12}$ alkyl and $C_1$~$C_{12}$ aryl respectively could be one selected from the group consisting of poly(methylphenyl)siloxane, poly(ethylphenyl)siloxane, poly(propylphenyl)siloxane, poly(butylphenyl)siloxane, poly(amylphenyl)siloxane, poly(hexylphenyl)siloxane, poly(heptylphenyl)siloxane, poly(octylphenyl)siloxane, poly(nonylphenyl)siloxane and poly(decylphenyl)siloxane. And the second composition (b) of the formula (II) whose $X^1$ and $X^2$ are $C_1$~$C_{12}$ alkyl and $C_1$~$C_{12}$ alkyl aryl respectively could be one selected from the group consisting of poly(methylbenzyl)siloxane, poly(ethylbenzyl)siloxane, poly(propylbenzyl)siloxane, poly(butylbenzyl)siloxane, poly(amylbenzyl)siloxane, poly(hexylbenzyl)siloxane, poly(heptylbenzyl)siloxane, poly(octylbenzyl)siloxane, poly(nonylbenzyl)

siloxane, poly(decylbenzyl)siloxane, poly(methylphenethyl)siloxane, poly(ethylphenethyl)siloxane, poly(propylphenethyl)siloxane, poly(butylphenethyl)siloxane, poly(amylphenethyl)siloxane, poly(hexylphenethyl)siloxane, poly(heptylphenethyl)siloxane, poly(octylphenethyl)siloxane, poly(nonylphenethyl)siloxane, poly(decylphenethyl)siloxane, poly(methyl 1-phenpropyl)siloxane, poly(ethyl 1-phenpropyl)siloxane, poly(propyl 1-phenpropyl)siloxane, poly(butyl 1-phenpropyl)siloxane, poly(amyl 1-phenpropyl)siloxane, poly(hexyl 1-phenpropyl)siloxane, poly(heptyl 1-phenpropyl)siloxane, poly(octyl 1-phenpropyl)siloxane, poly(nonyl 1-phenpropyl)siloxane, poly(decyl 1-phenpropyl)siloxane, poly(methyl 2-phenpropyl)siloxane, poly(ethyl 2-phenpropyl)siloxane, poly(propyl 2-phenpropyl)siloxane, poly(butyl 2-phenpropyl)siloxane, poly(amyl 2-phenpropyl)siloxane, poly(hexyl 2-phenpropyl)siloxane, poly(heptyl 2-phenpropyl)siloxane, poly(octyl 2-phenpropyl)siloxane, poly(nonyl 2-phenpropyl)siloxane, poly(decyl 2-phenpropyl)siloxane, poly(methyl 1-phenn-butyl)siloxane, poly(ethyl 1-phenn-butyl)siloxane, poly(propyl 1-phenn-butyl)siloxane, poly(butyl 1-phenn-butyl)siloxane, poly(amyl 1-phenn-butyl)siloxane, poly(hexyl 1-phenn-butyl)siloxane, poly(heptyl 1-phenn-butyl)siloxane, poly(octyl 1-phenn-butyl)siloxane, poly(nonyl 1-phenn-butyl)siloxane, poly(decyl 1-phenn-butyl)siloxane, poly(methyl 2-phenn-butyl)siloxane, poly(ethyl 2-phenn-butyl)siloxane, poly(propyl 2-phenn-butyl)siloxane, poly(butyl 2-phenn-butyl)siloxane, poly(amyl 2-phenn-butyl)siloxane, poly(hexyl 2-phenn-butyl)siloxane, poly(heptyl 2-phenn-butyl)siloxane, poly(octyl 2-phenn-butyl)siloxane, poly(nonyl 2-phenn-butyl)siloxane, poly(decyl 2-phenn-butyl)siloxane, poly(methyl 1-phensec-butyl)siloxane, poly(ethyl 1-phensec-butyl)siloxane, poly(propyl 1-phensec-butyl)siloxane, poly(butyl 1-phensec-butyl)siloxane, poly(amyl 1-phensec-butyl)siloxane, poly(hexyl 1-phensec-butyl)siloxane, poly(heptyl 1-phensec-butyl)siloxane, poly(octyl 1-phensec-butyl)siloxane, poly(nonyl 1-phensec-butyl)siloxane, poly(decyl 1-phensec-butyl)siloxane, poly(methyl 2-phensec-butyl)siloxane, poly(ethyl 2-phensec-butyl)siloxane, poly(propyl 2-phensec-butyl)siloxane, poly(butyl 2-phensec-butyl)siloxane, poly(amyl 2-phensec-butyl)siloxane, poly(hexyl 2-phensec-butyl)siloxane, poly(heptyl 2-phensec-butyl)siloxane, poly(octyl 2-phensec-butyl)siloxane, poly(nonyl 2-phensec-butyl)siloxane, poly(decyl 2-phensec-butyl)siloxane, poly(methyl 1-phenisobutyl)siloxane, poly(ethyl 1-phenisobutyl)siloxane, poly(propyl 1-phenisobutyl)siloxane, poly(butyl 1-phenisobutyl)siloxane, poly(amyl 1-phenisobutyl)siloxane, poly(hexyl 1-phenisobutyl)siloxane, poly(heptyl 1-phenisobutyl)siloxane, poly(octyl 1-phenisobutyl)siloxane, poly(nonyl 1-phenisobutyl)siloxane, poly(decyl 1-phenisobutyl)siloxane, poly(methyl 2-phenisobutyl)siloxane, poly(ethyl 2-phenisobutyl)siloxane, poly(propyl 2-phenisobutyl)siloxane, poly(butyl 2-phenisobutyl)siloxane, poly(amyl 2-phenisobutyl)siloxane, poly(hexyl 2-phenisobutyl)siloxane, poly(heptyl 2-phenisobutyl)siloxane, poly(octyl 2-phenisobutyl)siloxane, poly(nonyl 2-phenisobutyl)siloxane, poly(decyl 2-phenisobutyl)siloxane, poly(methylphen-tert-butyl)siloxane, poly(ethylphentert-butyl)siloxane, poly(propylphentert-butyl)siloxane, poly(butylphentert-butyl)siloxane, poly(amylphentert-butyl)siloxane, poly(hexylphentert-butyl)siloxane, poly(heptylphentert-butyl)siloxane, poly(octylphentert-butyl)siloxane, poly(nonylphentert-butyl)siloxane and poly(decylphentert-butyl)siloxane.

The second composition (b) is a compound of the formula (III), and at least one of the $X^1$ and $X^2$ is one of $C_1$~$C_{12}$ alkyl and $C_1$~$C_{12}$ cycloalkoxy. For example, the second composition (b) whose $X^1$ and $X^2$ are $C_1$~$C_{12}$ alkyl could be one selected from the group consisting of polycyclo(dimethyl)siloxane, polycyclo(diethyl)siloxane, polycyclo(dipropyl)siloxane, polycyclo(dibutyl)siloxane, polycyclo(diamyl)siloxane, polycyclo(dihexyl)siloxane, polycyclo(diheptyl)siloxane, polycyclo(dioctyl)siloxane, polycyclo(dinonyl)siloxane, polycyclo(didecyl)siloxane, polycyclo(methylethyl)siloxane, polycyclo(methylpropyl)siloxane, polycyclo(methylbutyl)siloxane, polycyclo(methylamyl)siloxane, polycyclo(methylhexyl)siloxane, polycyclo(methylheptyl)siloxane, polycyclo(methyloctyl)siloxane, polycyclo(methylnonyl)siloxane, polycyclo(methyldecyl)siloxane, polycyclo(ethylpropyl)siloxane, polycyclo(ethylbutyl)siloxane, polycyclo(ethylamyl)siloxane, polycyclo(ethylhexyl)siloxane, polycyclo(ethylheptyl)siloxane, polycyclo(ethyloctyl)siloxane, polycyclo(ethylnonyl)siloxane, polycyclo(ethyldecyl)siloxane, polycyclo(propylbutyl)siloxane, polycyclo(propylamyl)siloxane, polycyclo(propylhexyl)siloxane, polycyclo(propylheptyl)siloxane, polycyclo(propyloctyl)siloxane, polycyclo(propylnonyl)siloxane, polycyclo(propyldecyl)siloxane, polycyclo(butylamyl)siloxane, polycyclo(butylhexyl)siloxane, polycyclo(butylheptyl)siloxane, polycyclo(butyloctyl)siloxane, polycyclo(butylnonyl)siloxane, polycyclo(butyldecyl)siloxane, polycyclo(amylhexyl)siloxane, polycyclo(amylheptyl)siloxane, polycyclo(amyloctyl)siloxane, polycyclo(amylnonyl)siloxane, polycyclo(amyldecyl)siloxane, polycyclo(hexylheptyl)siloxane, polycyclo(hexyloctyl)siloxane, polycyclo(hexylnonyl)siloxane, polycyclo(hexyldecyl)siloxane, polycyclo(heptyloctyl)siloxane, polycyclo(heptylnonyl)siloxane, polycyclo(heptyldecyl)siloxane, polycyclo(octylnonyl)siloxane, polycyclo(octyldecyl)siloxane and polycyclo(nonyldecyl)siloxane.

The second composition (b) whose $X^1$ and $X^2$ are $C_1$~$C_{12}$ alkyl and $C_1$~$C_{12}$ cycloalkoxy respectively could be one selected from the group consisting of polycyclo(methylepoxyl)siloxane, polycyclo(ethylepoxyl)siloxane, polycyclo(propylepoxyl)siloxane, polycyclo(butylepoxyl)siloxane, polycyclo(amylepoxyl)siloxane, polycyclo(hexylepoxyl)siloxane, polycyclo(heptylepoxyl)siloxane, polycyclo(octylepoxyl)siloxane and polycyclo(nonylepoxyl)siloxane.

Besides, the second composition (b) is a compound of the formula (II), and one of the $X^1$ and the $X^2$ is carbonyl. The second composition (b) could be one selected from the group consisting of poly(methylcarbonyl)siloxane, poly(ethylcarbonyl)siloxane, poly(propylcarbonyl)siloxane, poly(butylcarbonyl)siloxane, poly(amylcarbonyl)siloxane, poly(hexylcarbonyl)siloxane, poly(heptylcarbonyl)siloxane, poly(octylcarbonyl)siloxane, poly(nonylcarbonyl)siloxane and poly(decylcarbonyl)siloxane.

The third composition (c) of the present invention is an organic metallic compound, which includes $R^4Li$, $R^4R^5Mg$, $R^4R^5R^6Al$, a mixture of $R^4Li$ and $R^4R^5Mg$ and a mixture of $R^4Li$ and $R^4R^5R^6Al$, wherein the $R^4$ is one selected from the group consisting of $C_1$~$C_{12}$ alkyl, $C_1$~$C_{12}$ alkoxy, $C_6$~$C_{12}$ aryl, $C_6$~$C_{12}$ alkoxy and hydrogen, and the $R^5$ and $R^6$ are identical or different and are ones selected from the group consisting of $C_1$~$C_{12}$ alkyl, $C_6$~$C_{12}$ aryl, hydrogen and halogen; but the $R^4$, $R^5$ and $R^6$ are not methyl at the same time.

According to the third composition (c) of present invention, either of the $R^4R^5R^6Al$ and the mixture thereof is one selected from the group consisting of tri-ethyl aluminum, tri-n-propyl aluminum, tri-isopropyl aluminum, tri-butyl aluminum, tri(sec-butyl)aluminum, tri(isobutyl)aluminum, tri(n-pentyl)aluminum, tri(isopentyl)aluminum, tri(n-hexyl)aluminum, tri(isohexyl)aluminum, tri(1-methylpentyl)aluminum, tri(2,5-dimethyloctyl)aluminum, tri(2,6- dimethyloctyl)aluminum, tri(2-ethylhexyl)aluminum, triphenyl aluminum, diethyl aluminum chloride, ethyl aluminum dichloride, tripropyl aluminum chloride, dibutyl aluminum chloride, diisobutyl aluminum chloride, butyl aluminum dichloride and compositions thereof. The $R^4R^5R^6Al$ and the mixture thereof used suitably in the present invention is one selected from the group consisting of tri-ethyl aluminum, tri-isopropyl aluminum, tri-butyl aluminum, tri(isobutyl)aluminum and diethyl aluminum chloride.

According to the third composition (c) of present invention, either of the $R^4Li$ and the mixture thereof is one selected from the group consisting of n-propyl lithium, iso-propyl lithium, n-butyl lithium, iso-butyl lithium, tert-butyl lithium, n-pentyl lithium, phenyl lithium, tolyl lithium and a dilithio hydrocarbon selected from the group consisting of 1,4-dilithio-n-butane, 1,5-dilithio-pentane, 1,2-dilithio-diphenyl ethane, 1,4-dilithio-1,1,4,4-tetraphenyl butane, 1,3- or 1,4-bis(1-litho-3-methylpentyl)-benzene and a combination thereof.

According to the third composition (c) of present invention, the organic magnesium of the third composition (c) is one of Grignard compound and the dialkyl compound of magnesium. For commercial application, there are many magnesium compounds existing in a type of using an organic magnesium compound to dissolve in an inert aliphatic hydrocarbon. Either of the $R^4R^5Mg$ and the mixture thereof is one selected from the group consisting of bis-n-butyl magnesium, bis-tert-butyl magnesium, bis-isobutyl magnesium, bis-n-propyl magnesium, bis-isopropyl magnesium, bisoctyl magnesium, biscyclohexyl magnesium, bis-2-ethylhexyl magnesium, n-butyl-isobutyl magnesium, n-butyloctyl magnesium, n-butyl-2-ethylhexyl magnesium and a combination thereof.

The hydrogenation of the present invention involves bringing the conjugated diene polymer in one of an inert organic solvent and an inert organic solvent which includes a portion of ether and amine polar compound into contact with hydrogen in the presence of a hydrogenation catalyst composition of the present invention. Thus, the unsaturated double bonds in the conjugated diene units of the conjugated diene polymer are selectively hydrogenated. The hydrogenation catalyst composition of the present invention includes hydrogenation catalyst compositions (a), (b) and (c) as mentioned above. Specifically, for example, gaseous hydrogen is introduced into the conjugated diene polymer. Then, stirring is conducted to completely contact the hydrogen and conjugated diene polymer. Hydrogenation could be conducted by a batch or continuous methods.

The addition manner of the hydrogenation catalyst compositions (a), (b) and (c) is not limited. For example, catalyst composition (b) could be first added to the polymer solution whose activity has been terminated, and then a mixed solution of catalyst compositions (a) and (c) are added. Alternatively, catalyst composition (b) could be first added to the polymer solution whose activity has not been terminated, followed by a catalyst composition (a) solution and a catalyst composition (c) solution, respectively. Furthermore, catalyst compositions (b) and (c) also could be first added to the polymer solution after reacting, and then a reactant of catalyst compositions (a) and (c) are added. After all the catalysts are added to the polymer, the polymer is kept at the inert gas atmosphere. The catalyst composition still has relatively good activity even after storage for a long time. Therefore, the catalyst composition of the present invention is very suitable for the requirement of industrial mass production.

According to the present invention, the inert organic solvent to dissolve the hydrogenation catalysts and the conjugated diene polymer could be a linear or branched hydrocarbon compound such as pentane, hexane, heptane, octane and the like; or a cyclic hydrocarbon compound such as cyclohexane, cycloheptane, and methylheptane. Cyclohexane and n-hexane are the most suitable example. Alternatively, the inert organic solvent could be aromatic hydrocarbon such as benzene, toluene, xylene and ethylbenzene.

Preparation of catalyst compositions (a), (b) and (c) should be conducted in inert gas and low water content. The inert gas refers to helium, neon, nitrogen and the like, which will not participate in hydrogenation. Air, oxygen or high water content atmosphere will oxidize or decompose the hydrogenation catalysts, causing reduced activity in catalysts. In the condition under which the catalyst is pre-mixed, the temperature is preferably ranged from 0° C. to 250° C. The activity of catalyst would be reduced at a higher temperature but the hydrogenating ability would be disappeared since the activity of catalyst is lower at a lower temperature.

According to the present invention, conjugated diene polymers to be used in the present invention are produced by any of the methods known in the art, such as, for example, anionic polymerization, cationic polymerization, free radical polymerization, complex polymerization, solution polymerization, and emulsion polymerization. It is preferable to use an organic lithium compound to serve as a catalyst initiator, thus obtaining a living polymer. The living polymer contains a carbon-lithium ion at the terminal end of the molecule chain. An activity of the polymer is eliminated from a deactivator. The deactivator includes at least one selected from the group consisting of water, alcohol, organic acid, ketone and organic halides. Therefore, when the monomer is added, polymerization could further proceed to lengthen the molecule chain. Examples of such organic lithium compounds are monolithium compounds such as n-propyl lithium, iso-propyl lithium, n-butyl lithium, iso-butyl lithium, tert-butyl lithium, n-pentyl lithium, phenyl lithium, tolyl lithium and a dilithio hydrocarbon selected from the group consisting of 1,4-dilithio-n-butane, 1,5-dilithio-pentane, 1,2-dilithio-diphenyl ethane, 1,4-dilithio-1,1,4,4-tetraphenyl butane, 1,3- or 1,4-bis(1-litho-3-methylpentyl)-benzene and a combination thereof. The amount of such organic lithium compound may be suitably selected depending on the desired molecular weight of the polymer.

The term "conjugated diene polymer" as used in the present invention describes both a homopolymer and a copolymer of a conjugated diene. The above polymers contain an active radical or a non-active radical at the terminal end of the molecule chain. The active radical is one selected from the group consisting of carbon free radical, anionic radical of carbon alkali metal ion and carbon cationic radical. The copolymer of a conjugated diene could be random, block, graft and taper copolymers of two or more conjugated dienes, or random, block, graft and taper copolymers of at least one conjugated diene monomer and at least one vinyl aromatic hydrocarbon.

Conjugated diene monomer suitable for use in the present invention could be a conjugated diene having carbon atoms from 4 to 12. Representative examples include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene and a mixture thereof. Butadiene, isoprene and a mixture of butadiene and isoprene are suitable for use in the present invention.

The suitable styrene-butadiene copolymer used in the present invention is hydrogenated into a styrene-ethylene-butylene-styrene (SEBS) block copolymer. The suitable styrene-isoprene copolymer used in the present invention is hydrogenated into a styrene-ethylene-propylene-styrene (SEPS) block copolymer. The suitable styrene-(butadiene/isoprene) copolymer used in the present invention is hydrogenated into a styrene-ethylene-ethylene-propylene-styrene (SEEPS) block copolymer.

The conjugated diene polymer could have a number average molecular weight of 1000 to 1000000.

When the conjugated diene/vinyl aromatic hydrocarbon copolymer is hydrogenated, a high value thermoplastic elastomer is obtained. Aromatic hydrocarbon monomers suitable for use in the present invention include styrene, tert-butylstyrene, α-methyl styrene, o-methyl styrene, p-methyl styrene, divinyl benzene, 1,1-diphenyl ethylene, vinyl naphthalene, N,N-dimethyl-p-aminoethylstyrene and N,N-diethyl-p-aminoethylstyrene, preferably styrene. Representative examples of conjugated diene/vinyl aromatic hydrocarbon copolymer include (1) butadiene/styrene copolymer, (2) isoprene/styrene copolymer and (3) butadiene/isoprene/styrene copolymer.

In addition, a tertiary amine compound or ether compound could be added to the conjugated diene polymer system in order to increase the vinyl structure content of the conjugated diene. Such compounds suitable for use include general tertiary amine compounds, tetrahydrofuran and diethyl ether.

0.0001 to 50 millimoles of the hydrogenation catalyst composition (a) based on 100 g of the conjugated diene polymer is sufficient. If more than 50 millimoles is used, the hydrogenation result will lose economical efficiency, and the catalyst removal procedures will be more complicated. Preferably, the hydrogenation catalyst composition (a) is present in an amount of 0.002 to 10 millimoles based on 100 g of the conjugated diene polymer.

Preferably, the molar ratio of the hydrogenation catalyst composition (b) to the hydrogenation catalyst composition (a) is 0.1 to 50. If the molar ratio is less than 0.1, the hydrogenation catalyst could not efficiently increase the hydrogenation activity, and thus, hydrogenation stops and the ideal goal could not be achieved. If the molar ratio is higher than 50, the catalyst must be removed and unnecessary secondary reaction easily occurs, which hinders the hydrogenation. Most preferably, the molar ratio of the hydrogenation catalyst composition (b) to the hydrogenation catalyst composition (a) is 1 to 15.

Preferably, the molar ratio of the hydrogenation catalyst composition (c) to the hydrogenation catalyst composition (a) is 0.1 to 50. If the molar ratio is less than 0.1, the catalyst composition (c) could not activate the catalyst composition (a) and the hydrogenation conversion is poor. If the molar ratio is higher than 50, the unnecessary secondary products will rapidly decrease the hydrogenation conversion. Also, the catalyst must be removed, which makes the subsequent procedures more complicated.

The hydrogenation reaction of the present invention could be conducted at a temperature of 0° C. to 250° C. If the reaction temperature is lower than 0° C., the reaction rate is too low and the catalyst composition (a) amount must be increased, impacting economical efficiency. If the reaction temperature is higher than 250° C., the catalyst will be deactivated, thus decreasing the catalytic activity. Also, secondary reaction easily occurs, which in turn decomposes the polymer to form gel. Preferably, the hydrogenation temperature is 40° C. to 200° C.

The hydrogenation could be conducted preferably at a hydrogen pressure of 1 kg/cm$^2$ to 150 kg/cm$^2$ and most preferably 1 to 50 kg/cm$^2$. When the hydrogen pressure is less than 1 kg/cm$^2$, the reaction rate may be not obvious. When the hydrogen pressure is higher than 150 kg/cm$^2$, the hydrogenation will rapidly stop. The catalyst amount could be decreased by increasing the hydrogen pressure. In order to decrease the catalyst amount, it is preferable to conduct hydrogenation at higher hydrogen pressure.

According to the present invention, the hydrogenation time could be several seconds to 40 hours. Suitable range could be adjusted by the reaction conditions such as the ratio of the catalysts, hydrogen pressure, and hydrogenation temperature.

According to the present invention, the catalyst composition amount, hydrogen pressure and hydrogenation temperature could be adjusted in order to achieve the desired hydrogenation conversion of double bonds in the conjugated diene polymer. Using the catalyst composition of the present invention to hydrogenate the conjugated diene/vinyl aromatic hydrocarbon copolymer, at least 50%, even at least 90%, of the unsaturated double bonds in the conjugated diene units are hydrogenated. In contrast, lower than 30%, and even lower than 10%, of the aromatic ring (such as benzene ring) double bonds in the vinyl aromatic hydrocarbon units are hydrogenated. That is to say, the catalyst composition of the present invention has relatively good catalytic selectivity. The hydrogenation conversion for the conjugated diene units could be detected by IR spectrum analysis, and the hydrogenation conversion for the aromatic ring double bonds in the vinyl aromatic hydrocarbon units could be detected by UV spectrum analysis, which could be referred to U.S. Pat. No. 4,501,857.

The polymer solution obtained from hydrogenation using the hydrogenation catalyst composition of the present invention could be coagulated by adding a polar solvent. Such polar solvent is a poor solvent for the hydrogenated polymer, such as methanol or acetone. Or, alternatively, the hydrogenated polymer solution could be poured into hot water, stirred, and then distilled for separation. Or, the hydrogenated polymer solution could be directly heated to evaporate the solvent for separation.

According to the present invention, the conjugated diene polymer could be successfully hydrogenated using a small amount of a hydrogenation catalyst composition with relatively high activity. Since the catalyst composition concentration is very low, most catalyst is separated from the polymer or decomposes during the polymer separation procedure. Therefore, there is no need to wash or remove the catalyst from the hydrogenated polymer, greatly enhancing economic efficiency.

A feature of the catalyst composition of the present invention is that the catalyst composition (b) could combine with other catalysts to stabilize other catalysts and enhance the catalytic activity thereof. Therefore, when the catalyst composition of the present invention is added to the conjugated diene polymer, it could be stored for a period of time in the inert gas atmosphere, generally more than 1 hour, still maintaining good catalytic activity and reproducibility. Another feature is that the catalyst composition of the present invention has high hydrogenation activity at a higher temperature. In addition, the catalyst composition of the present invention will not lose the catalytic activity due to high hydrogenation reaction heat. Therefore, it is very suitable for commercial mass production.

Example 1

Preparation of SBS Copolymer 5400 g of cyclohexane, 7.4 millimoles of n-butyl lithium and 252 millimoles of tetrahydrofuran (THF) were charged in 10 L of a heater equipped with a stirrer. Then, 96 g of styrene was added and the polymerization was conducted at 45° C. Then, 400 g of butadiene and 96 g of styrene were added to the reaction system and the reaction mixture was further polymerized to an SBS (styrene-butadiene-styrene) tri-block copolymer (solid content=9.7%, Mw=230,000).

Example 2

1000 g of the polymer solution of SBS tri-block copolymer prepared from Example 1 was transferred to a pressure-resistant hydrogenation vessel and maintained in the nitrogen atmosphere. 0.11 millimoles of poly(dimethyl)siloxane was dissolved in 10 ml of cyclohexane at room temperature, 0.11 millimoles of poly(dimethyl)siloxane and 0.16 millimoles of n-butyl lithium were mixed in 10 ml of cyclohexane in a glove box, and 0.055 millimoles of bis(cyclopentadienyl)titanium dichloride and 0.33 millimoles of triisobutyl aluminum were mixed in 20 ml of cyclohexane. The above solutions were added to the SBS copolymer. Hydrogen was fed in under a pressure of 25 kg/cm$^2$ to undergo hydrogenation at 100° C.

FIG. 1 shows IR spectra of the SBS copolymer before and after hydrogenation. It could be seen that in the spectrum of the SBS tri-block copolymer before hydrogenation, the trans double bond is present at the wavelength peaks 968 cm$^{-1}$ and 995 cm$^{-1}$ and the 1,2-vinyl group double bond is present at the wavelength peak 912 cm$^{-1}$. After 1 hour of hydrogenation, it could be seen that the above peaks disappear obviously, the hydrogenation conversion (the hydrogenation conversion of the unsaturated double bond of the butadiene unit) was measured to 98%. The hydrogenation data are summarized in Table 1.

Example 3

1000 g of the polymer solution of SBS tri-block copolymer prepared from Example 1 was transferred to a pressure-resistant hydrogenation vessel and maintained in the nitrogen atmosphere. 0.11 millimoles of poly(dimethyl)siloxane was dissolved in 10 ml of cyclohexane at room temperature, 0.055 millimoles of bis(cyclopentadienyl)titanium dichloride was dissolved in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C. The butadiene hydrogenation conversion was measured to reach 76% after 30 minutes and reach 96% after 1 hour. The hydrogenation data are summarized in Table 1.

Example 4

1000 g of the polymer solution of SBS tri-block copolymer prepared from Example 1 was transferred to a pressure-resistant hydrogenation vessel and maintained in the nitrogen atmosphere. 0.11 millimoles of poly(diethyl)siloxane was dissolved in 10 ml of cyclohexane at room temperature, 0.055 millimoles of bis(cyclopentadienyl)titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C. The butadiene hydrogenation conversion was measured to reach 85% after 30 minutes and reach 95% after 1 hour. The hydrogenation data are summarized in Table 1.

Example 5

The same procedures described in Example 4 were repeated except that poly(diethyl)siloxane was changed to 0.165 millimoles of poly(methylepoxyl)siloxane dissolved in 10 ml of cyclohexane. 0.055 millimoles of bis(cyclopentadienyl)titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C. The butadiene hydrogenation conversion was measured to reach 90% after 30 minutes and reach 96% after 1 hour. The hydrogenation data are summarized in Table 1.

Example 6

The same procedures described in Example 3 were repeated except that poly(dimethyl)siloxane was changed to 0.2 millimoles of poly(methylphenyl)siloxane dissolved in 10 ml of cyclohexane. 0.055 millimoles of bis(cyclopentadienyl)titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C. The butadiene hydrogenation conversion was measured to reach 65% after 30 minutes, reach 86% after 1 hour and reach 95% after 1.5 hours. The hydrogenation data are summarized in Table 1.

Example 7

The same procedures described in Example 3 were repeated except that poly(dimethyl)siloxane was changed to 0.2 millimoles of polycyclo(dimethyl)siloxane dissolved in 10 ml of cyclohexane. 0.055 millimoles of bis(cyclopentadienyl)titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C. The butadiene hydrogenation conversion was measured to reach 65% after 30 minutes, reach 86% after 1 hour and reach 95% after 1.5 hours. The hydrogenation data are summarized in Table 1.

Example 8

The same procedures described in Example 3 were repeated except that poly(dimethyl)siloxane was changed to 0.275 millimoles of poly(methylphenmethyl)siloxane dissolved in 10 ml of cyclohexane. 0.055 millimoles of bis(cyclopentadienyl)titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C. The butadiene hydrogenation conversion was measured to reach 65% after 30 minutes, reach 76% after 1 hour and reach 95% after 2 hours. The hydrogenation data are summarized in Table 1.

Example 9

The same procedures described in Example 3 were repeated except that poly(dimethyl)siloxane was changed to 0.275 millimoles of poly(methylcarbonyl)siloxane dissolved in 10 ml of cyclohexane. 0.055 millimoles of bis(cyclopentadienyl)titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C. The butadiene hydrogenation conversion was measured to reach 65% after 30 minutes, reach 76% after 1 hour and reach 95% after 2 hours. The hydrogenation data are summarized in Table 1.

Example 10

The same procedures described in Example 3 were repeated except that poly(dimethyl)siloxane was changed to 0.25 millimoles of poly(propylphenyl)siloxane dissolved in 10 ml of cyclohexane. 0.055 millimoles of bis(cyclopentadienyl)titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C. The butadiene hydrogenation conversion was measured to reach 65% after 30 minutes, reach 86% after 1 hour and reach 95% after 1.5 hours. The hydrogenation data are summarized in Table 1.

Example 11

The same procedures described in Example 3 were repeated except that poly(dimethyl)siloxane was changed to 0.25 millimoles of polycyclo(diethyl)siloxane dissolved in 10 ml of cyclohexane. 0.055 millimoles of bis(cyclopentadienyl) titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C. The butadiene hydrogenation conversion was measured to reach 65% after 30 minutes, reach 86% after 1 hour and reach 95% after 1.5 hours. The hydrogenation data are summarized in Table 1.

Example 12

1000 g of the polymer solution of SBS tri-block copolymer prepared from Example 1 was transferred to a pressure-resistant hydrogenation vessel and maintained in the nitrogen atmosphere. The step of adding the catalyst is the same with Example 2. The above solutions were added to the SBS copolymer and maintained in the nitrogen atmosphere for 48 hours. Hydrogen was fed in under a pressure of 25 kg/cm$^2$ to undergo hydrogenation at 100° C. The butadiene hydrogenation conversion was measured to reach 62% after 30 minutes, reach 85% after 1 hour and reach 95% after 1.5 hours. The hydrogenation data are summarized in Table 1.

The below are several comparative examples used for comparing the embodiments of the present invention and describing the features and advantages of the catalyst compositions. It is worth to note that the catalyst compositions used in the comparative examples do not include the catalyst composition (b) existing in the present invention.

Comparative Example 1

The same procedures described in Example 3 were repeated except that poly(dimethyl)siloxane was not added. 0.055 millimoles of bis(cyclopentadienyl)titanium dichloride was dispersed in 10 ml of cyclohexane, and 0.33 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C.

Figure 2:
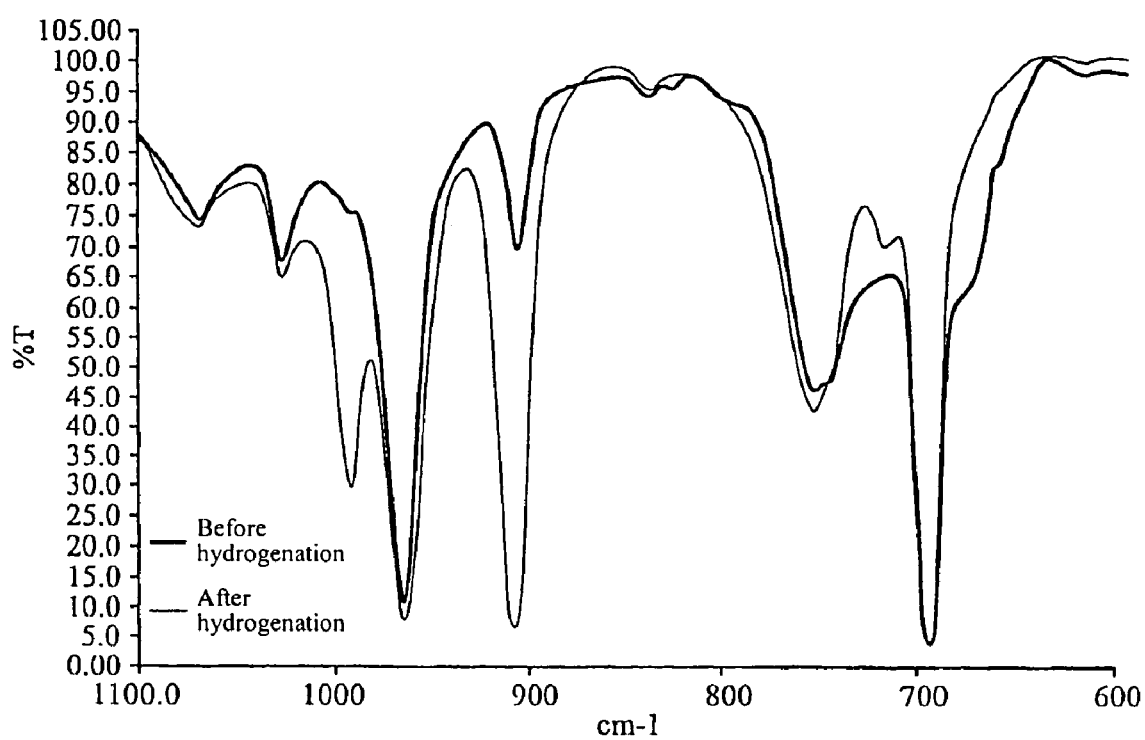
FIG. 2 is the IR spectrum schematically showing the SBS copolymer of comparative Example 1 before and after hydrogenation.

FIG. 2 shows IR spectra of the SBS copolymer before and after hydrogenation. It could be seen that in the spectrum of the SBS tri-block copolymer before hydrogenation, the trans double bond is present at the wavelength peaks 968 cm$^{-1}$ and 995 cm$^{-1}$ and the 1,2-vinyl group double bond is present at the wavelength peak 912 cm$^{-1}$. After 1 hour of hydrogenation, it could be seen that the 995 cm$^{-1}$ and 912 cm$^{-1}$ peaks have decreased absorption, but the absorption of 968 cm$^{-1}$ peak has almost no change. At that time, the butadiene hydrogenation conversion was measured to 23%. The hydrogenation data are summarized in Table 1.

Comparative Example 2

1000 g of the polymer solution of SBS tri-block copolymer prepared from Example 1 was transferred to a pressure-resistant hydrogenation vessel. The SBS copolymer was fed with hydrogen and stirred for 30 minutes. The same procedures described in Example 3 were repeated except that poly(dimethyl)siloxane was changed to 0.22 millimoles of n-butyl lithium. 0.055 millimoles of bis(cyclopentadienyl)titanium dichloride was dispersed in 10 ml of cyclohexane, and 0.44 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C. The butadiene hydrogenation conversion was measured to reach 15% after 30 minutes and reach 24% after 1 hour.

Comparative Example 3

1000 g of the polymer solution of SBS tri-block copolymer prepared from Example 1 was transferred to a pressure-resistant hydrogenation vessel. The SBS copolymer was fed with hydrogen and stirred for 30 minutes. The same procedures described in Example 3 were repeated except that poly(dimethyl)siloxane was changed to 0.22 millimoles of 1,1,3,3-tetramethyldisiloxane (Si—H compound). 0.055 millimoles of bis(cyclopentadienyl)titanium dichloride was dispersed in 10 ml of cyclohexane, and 0.44 millimoles of triisobutyl aluminum was dissolved in 10 ml of cyclohexane. The above solutions were added to the SBS copolymer. Hydrogen was fed in under a pressure of 25 kg/cm$^2$ to undergo hydrogenation at 100° C. The butadiene hydrogenation conversion was measured to reach 55% after 30 minutes, reach 57% after 1 hour and reach 57% after 2 hours. The catalyst composition will lose the catalytic activity due to high hydrogenation reaction temperature. The hydrogenation data are summarized in Table 1.

TABLE 1

| Example | Residual trans double bonds (%) | Residual 1,2-vinyl double bonds (%) | butadiene hydrogenation conversion (%) | benzene ring hydrogenation conversion (%) |
|---|---|---|---|---|
| Example 2 | 1.7 | 0.2 | 98 | <1 |
| Example 3 | 2.6 | 0.4 | 96 | <1 |
| Example 4 | 3.5 | 0.8 | 95 | <1 |
| Example 5 | 2.7 | 0.6 | 96 | <1 |
| Example 6 | 3.1 | 0.8 | 95 | <1 |
| Example 7 | 3.4 | 0.3 | 95 | <1 |
| Example 8 | 4.4 | 1 | 95 | <1 |
| Example 9 | 4.1 | 0.9 | 95 | <1 |
| Example 10 | 4.2 | 0.8 | 95 | <1 |
| Example 11 | 4.2 | 0.8 | 95 | <1 |
| Example 12 | 4.0 | 0.8 | 95 | <1 |
| Comp. Ex. 1 | 75.5 | 1.5 | 23 | <1 |
| Comp. Ex. 2 | 74.4 | 1.6 | 24 | <1 |
| Comp. Ex. 3 | 41 | 1.3 | 57 | <1 |

The hydrogenation data summarized in Table 1 are obtained by using the FT-Infrared Spectrometry (Perkin Elmer) to measure the catalyst compositions for hydrogenating a polymer having a conjugated diene. From Table 1, the percentages of the residual trans double bonds and the residual 1,2-vinyl double bonds are lower than 5% and the percentage of the 1,3-butadiene hydrogenation conversion is higher than 95%. On the other hand, the percentages of the residual trans double bonds and the residual 1,2-vinyl double bonds are much higher since the catalyst compositions of the comparative examples 2 and 3 do not include the catalyst composition (b), and the percentage of the 1,3-butadiene hydrogenation conversion thereof is lower than 25%. The calculating formula of Examples 1-12 is:

The percentage of the residual trans double bonds (%) =

$$\frac{\text{Log}(T^{-1}_{(700 \text{ cm before hydrogenating})} / T^{-1}_{0(700 \text{ cm before hydrogenating})})}{\text{Log}(T^{-1}_{(700 \text{ cm before hydrodgenating})} / T^{-1}_{0(700 \text{ cm before hydrogenating})})} >$$

$$\frac{\text{Log}(T^{-1}_{(967 \text{ cm after hydrogenating})} / T^{-1}_{0(967 \text{ cm after hydrogenating})})}{\text{Log}(T^{-1}_{(967 \text{ cm after hydrodgenating})} / T^{-1}_{0(967 \text{ cm after hydrogenating})})} \times 100\%$$

Wherein T is named after hydrogenating and $T_0$ is named before hydrogenating. The percentage of butadiene hydrogenation conversion is: 100−the percentage of the residual trans double bonds.

Examples 13-18

The catalyst compositions for hydrogenating and the amounts thereof are prepared from Example 3, but the hydrogenation temperature, hydrogenation pressure and reaction time used in Examples 13-18 are different from those used in Example 3. The butadiene hydrogenation conversions thereof (%) are summarized in Table 2.

TABLE 2

| Example | Hydrogenation temperature (°C.) | Hydrogenation pressure (kg/cm²) | Reaction time (hr) | butadiene hydrogenation conversion (%) |
|---|---|---|---|---|
| Example 13 | 60 | 10 | 2.5 | 65 |
| Example 14 | 60 | 10 | 4 | 94 |
| Example 15 | 80 | 10 | 2 | 97 |
| Example 16 | 80 | 25 | 1.6 | 97 |
| Example 17 | 100 | 10 | 1.8 | 97 |
| Example 18 | 100 | 25 | 1 | 97 |

Accordingly, the present invention provides a catalyst composition for successful hydrogenation of a conjugated diene polymer using a small amount of a hydrogenation catalyst composition with relatively high activity. The catalyst composition could be stored for a long period of time and maintains good catalytic activity stability and reproducibility, which greatly enhances economical efficiency. Moreover, the method for hydrogenating a polymer having a conjugated diene could be performed over a wide range of temperatures since the catalyst composition has a higher hydrogenating activity over a wide range of temperatures. In addition, the catalyst composition of the present invention will not lose the catalytic activity due to high hydrogenation reaction heat. Therefore, it is very suitable for the operating requirements of industrial continuous production.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A catalyst composition for hydrogenating a polymer having a conjugated diene, wherein said polymer is one of a conjugated diene homopolymer and a copolymer of a vinyl aromatic hydrocarbon, comprising:
   (a) a first composition having one of a titanium compound of a formula (I) and a mixture thereof:

wherein:
   $R^1$ and $R^2$ are identical or different and are ones selected from the group consisting of hydrogen, halogen, $C_1$~$C_8$ alkyl, $C_1$~$C_8$ alkoxy, $C_6$~$C_{12}$ cycloalkyl, phenyl, phenoxy, $C_7$~$C_{10}$ arylalkoxy, $C_7$~$C_{10}$ arylalkyl, carboxy, —$CH_2P(phenyl)_2$, —$CH_2Si(C_1$~$C_5$ alkyl$)_3$ and —$P(phenyl)_2$; and A is one selected from the group consisting of cyclopentadienyl, fluorenyl, indenyl and derivatives thereof;

(b) a second composition having one selected from the group consisting of a first compound of a formula (II), a second compound of a formula (III) and a mixture thereof:

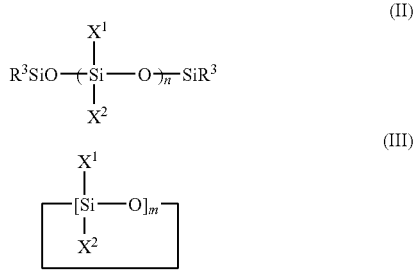

wherein said formula (II) has a chain structure, said formula (III) has a cyclic structure, said R is $C_1$~$C_{12}$ alkyl, said $X^1$ and $X^2$ are ones selected from the group consisting of $C_1$~$C_{12}$ alkyl, $C_1$~$C_{12}$ cycloalkoxy, aryl, $C_1$~$C_{12}$ alkyl aryl and carbonyl, and n>1 and m>2; and (c) a third composition having an organic metallic compound.

2. The catalyst composition as claimed in claim 1, wherein said first composition is one of a bis(cyclopentadienyl)titanium halide and a derivative thereof.

3. The catalyst composition as claimed in claim 2, wherein said first composition is one selected from the group consisting of bis(cyclopentadienyl)titanium difluorides, bis(cyclopentadienyl)titanium dichlorides, bis[(2,4-diphenylphosphinecyclopentadienyl)]titanium difluorides, bis[(2,4-dimethylphosphinecyclopentadienyl)]titanium difluorides, bis[(2,4-diphenylphosphinecyclopentadienyl)]titanium dichlorides, dimethoxy bis(cyclopentadienyl)titanium dichlorides, bis[(2,4-dimethylphosphinecyclopentadienyl)] titanium dichlorides, bis(cyclopentadienyl)titanium dibromides, bis[(2,4-diphenylphosphinecyclopentadienyl)]titanium dibromides, bis[(2,4-dimethylphosphinecyclopentadienyl)]titanium dibromides, bis(ethyl cyclopentadienyl)titanium dichlorides, bis(n-propylcyclopentadienyl)titanium dichlorides, bis(n-butylcyclopentadienyl)titanium dichlorides, bis(2-ethylhexylcyclopentadienyl)titanium dichlorides, (dimethylsilylene)-bis($\eta^5$-2,4-cyclopentadien-1-ylidene) and (ethylene)-bis($\eta^5$-2,4-cyclopentadien-1-ylidene).

4. The catalyst composition as claimed in claim 1, wherein said first composition is an organic carbohydrate of a bis(cyclopentadienyl)titanium and a derivative thereof.

5. The catalyst composition as claimed in claim 4, wherein said first composition is one selected from the group consisting of bis(cyclopentadienyl)titanium dimethyl, bis(cyclopentadienyl)titanium dimethoxy, bis(2,4-diphenylphosphinecyclopentadienyl)titanium dimethoxy, bis(2,4-dimethylphosphinecyclopentadienyl)titanium dimethoxy, bis(cyclopentadienyl)titanium diethoxy, bis(2,4-diphenylphosphinecyclopentadienyl)titanium diethoxy, bis(2,4-dimethylphosphinecyclopentadienyl)titanium diethoxy, bis (2,4-diphenylphosphinecyclopentadienyl)titanium diphenoxy and bis(2,4-dimethylphosphinecyclopentadienyl) titanium diphenoxy.

6. The catalyst composition as claimed in claim 1, wherein said first composition is one selected from the group consisting of bifluorenyl titanium halide, biindenyl titanium halide and a derivative thereof.

7. The catalyst composition as claimed in claim 6, wherein said first composition is one selected from the group consisting of bis(1-fluorenyl)titanium dichlorides, bis(1-indenyl)titanium dichlorides, bis(dimethoxyfluorenyl)titanium dichlorides, bis(fluorenyl)titanium difluorides, bis(indenyl) titanium difluorides, bis(dimethoxylfluorenyl)titanium difluorides, bis(fluorenyl)titanium dibromides, bis(indenyl)titanium dibromides, bis(dimethoxylfluorenyl)titanium and bis (indenyl)titanium dibromides.

8. The catalyst composition as claimed in claim 1, wherein said first composition is an organic carbohydrate selected from the group consisting of bifluorenyl titanium, biindenyl titanium and a derivative thereof.

9. The catalyst composition as claimed in claim 8, wherein said first composition is one selected from the group consisting of bis(fluorenyl)titanium dimethyl, bis(fluorenyl)titanium dimethoxy, bis(indenyl)titanium dimethoxy, bis (dimethoxylfluorenyl)titanium dimethoxy, bis(indenyl) titanium dimethoxy, bis(fluorenyl)titanium dimethanol, bis (indenyl)titanium dimethanol, bis(dimethoxylfluorenyl) titanium dimethanol, bis(indenyl)titanium dimethanol, bis (fluorenyl)titanium diphenoxy, bis(indenyl)titanium diphenoxy, bis(dimethoxylfluorenyl)titanium diphenoxy and bis(indenyl)titanium diphenoxy.

10. The catalyst composition as claimed in claim 1, wherein said second composition is a compound of said formula (II), and at least one of said $X^1$ and $X^2$ is one of $C_1$~$C_{12}$ alkyl and $C_1$~$C_{12}$ cycloalkoxy.

11. The catalyst composition as claimed in claim 10, wherein said second composition is one selected from the group consisting of poly(dimethyl)siloxane, poly(diethyl)siloxane, poly(dipropyl)siloxane, poly(dibutyl)siloxane, poly (diamyl)siloxane, poly(dihexyl)siloxane, poly(diheptyl)siloxane, poly(dioctyl)siloxane, poly(dinonyl)siloxane, poly (didecyl)siloxane, poly(methylepoxyl)siloxane, poly (ethylepoxyl)siloxane, poly(propylepoxyl)siloxane, poly (butylepoxyl)siloxane, poly(amylepoxyl)siloxane, poly (hexylepoxyl)siloxane and poly(heptylepoxyl)siloxane.

12. The catalyst composition as claimed in claim 1, wherein said second composition is a compound of said formula (II), and at least of one of said $X^1$ and $X^2$ is one of aryl and $C_1$~$C_{12}$ alkyl aryl.

13. The catalyst composition as claimed in claim 12, wherein said second composition is one selected from the group consisting of poly(methylphenyl)siloxane, poly(ethylphenyl)siloxane, poly(propylphenyl)siloxane, poly(butylphenyl)siloxane, poly(amylphenyl)siloxane, poly(hexylphenyl)siloxane, poly(heptylphenyl)siloxane, poly (octylphenyl)siloxane, poly(nonylphenyl)siloxane, poly (decylphenyl)siloxane, poly(methylbenzyl)siloxane, poly (ethylbenzyl)siloxane, poly(propylbenzyl)siloxane, poly (butylbenzyl)siloxane, poly(amylbenzyl)siloxane, poly (hexylbenzyl)siloxane, poly(heptylbenzyl)siloxane, poly (octylbenzyl)siloxane, poly(nonylbenzyl)siloxane, poly (decylbenzyl)siloxane, poly(methylphenethyl)siloxane, poly (ethylphenethyl)siloxane, poly(propylphenethyl)siloxane, poly(butylphenethyl)siloxane, poly(amylphenethyl)siloxane, poly(hexylphenethyl)siloxane, poly(heptylphenethyl)siloxane and poly(octylphenethyl)siloxane.

14. The catalyst composition as claimed in claim 1, wherein said second composition is a compound of said formula (II), and one of said $X^1$ and said $X^2$ is carbonyl.

15. The catalyst composition as claimed in claim 14, wherein said second composition is one selected from the group consisting of poly(methylcarbonyl)siloxane, poly(ethylcarbonyl)siloxane, poly(propylcarbonyl)siloxane, poly(butylcarbonyl)siloxane and poly(amylcarbonyl)siloxane.

16. The catalyst composition as claimed in claim 1, wherein said second composition is a compound of said formula (III), and said $X^1$ and said $X^2$ are identical or different and are ones of $C_1 \sim C_{12}$ alkyl and $C_1 \sim C_{12}$ cycloalkoxy.

17. The catalyst composition as claimed in claim 16, wherein said second composition is one selected from the group consisting of polycyclo(dimethyl)siloxane, polycyclo(diethyl)siloxane, polycyclo(dipropyl)siloxane, polycyclo(dibutyl)siloxane, polycyclo(diamyl)siloxane, polycyclo(dihexyl)siloxane, polycyclo(diheptyl)siloxane, polycyclo(dioctyl)siloxane, polycyclo(dinonyl)siloxane, polycyclo(didecyl)siloxane, polycyclo(methylethyl)siloxane, polycyclo(methylpropyl)siloxane, polycyclo(methylbutyl)siloxane, polycyclo(methylamyl)siloxane, polycyclo(methylepoxyl)siloxane, polycyclo(ethylepoxyl)siloxane, polycyclo(propylepoxyl)siloxane, polycyclo(butylepoxyl)siloxane, polycyclo(amylepoxyl)siloxane and polycyclo(hexylepoxyl)siloxane.

18. The catalyst composition as claimed in claim 1, wherein said third composition includes one selected from the group consisting of $R^4Li$, $R^4R^5Mg$ $R^4R^4R^5Al$ and a mixture thereof, wherein said $R^4$ is one selected from the group consisting of $C_1 \sim C_{12}$ alkyl, $C_1 \sim C_{12}$ alkoxy, $C_6 \sim C_{12}$ aryl, $C_6$-$C_{12}$ alkoxy and hydrogen, and said $R^5$ and $R^6$ are identical or different and are ones selected from the group consisting of $C_1 \sim C_{12}$ alkyl, $C_6$-$C_{12}$ aryl, hydrogen and halogen; but said $R^4$, $R^5$ and $R^6$ are not methyl at the same time.

19. The catalyst composition as claimed in claim 18, wherein said mixture is one of a mixture of $R^4Li$ and $R^4R^5Mg$ and a mixture of $R^4Li$ and $R^4R^5R^6Al$.

20. The catalyst composition as claimed in claim 18, wherein either of said $R^4R^5R^6Al$ and said mixture thereof is one selected from the group consisting of tri-ethyl aluminum, tri-n-propyl aluminum, tri-isopropyl aluminum, tri-butyl aluminum, tri(sec-butyl)aluminum, tri(isobutyl)aluminum, tri(n-pentyl)aluminum, tri(isopentyl)aluminum, tri(n-hexyl)aluminum, tri(isohexyl)aluminum, tri(1-methylpentyl)aluminum, tri(2,5-dimethyloctyl)aluminum, tri(2,6-dimethyloctyl)aluminum, triphenyl aluminum, diethyl aluminum chloride, ethyl aluminum dichloride, tripropyl aluminum chloride, dibutyl aluminum chloride, diisobutyl aluminum chloride, butyl aluminum dichloride and compositions thereof.

21. The catalyst composition as claimed in claim 20, wherein said third composition is one of tri-isobutyl aluminum and tri-ethyl aluminum.

22. The catalyst composition as claimed in claim 18, wherein either of said $R^4Li$ and said mixture thereof is one selected from the group consisting of n-propyl lithium, iso-propyl lithium, n-butyl lithium, iso-butyl lithium, tert-butyl lithium, n-pentyl lithium, phenyl lithium, tolyl lithium and a dilithio hydrocarbon selected from the group consisting of 1,4-dilithio-n-butane, 1,5-dilithio-pentane, 1,2-dilithiodiphenyl ethane, 1,4-dilithio-1,1,4,4-tetraphenyl butane, 1,3- or 1,4-bis(1-litho-3-methylpentyl)-benzene and a combination thereof.

23. The catalyst composition as claimed in claim 22, wherein said third composition is one of n-butyl lithium and iso-butyl lithium.

24. The catalyst composition as claimed in claim 18, wherein either of said $R^4R^5Mg$ and said mixture thereof is one selected from the group consisting of bis-n-butyl magnesium, bis-tert-butyl magnesium, bis-isobutyl magnesium, bis-n-propyl magnesium, bis-isopropyl magnesium, bisoctyl magnesium, biscyclohexyl magnesium, bis-2-ethylhexyl magnesium, n-butyl-isobutyl magnesium, n-butyloctyl magnesium, n-butyl-2-ethylhexyl magnesium and a combination thereof.

25. The catalyst composition as claimed in claim 1, wherein a molar ratio of said third composition to said titanium compound is larger than 1.

26. The catalyst composition as claimed in claim 1, wherein said mixture includes $R^4R^5R^6Al$ and $R^4Li$.

27. The catalyst composition as claimed in claim 1, wherein said polymer has an active carbon-lithium ion pair on an end thereof.

28. The catalyst composition as claimed in claim 27, wherein an activity of said polymer having said active carbon-lithium ion pair on said end thereof is eliminated from a deactivator.

29. The catalyst composition as claimed in claim 28, wherein said deactivator comprises at least one selected from the group consisting of water, alcohol, organic acid, ketone and organic halides.

30. The catalyst composition as claimed in claim 1, wherein said polymer is obtained through an anionic polymerization, a free radical polymerization, a coordination polymerization and a cationic polymerization.

31. The catalyst composition as claimed in claim 1, wherein said second composition is added into a solution of said polymer first and then a mixture of said first composition and third composition is added thereinto.

32. The catalyst composition as claimed in claim 1, wherein a mixture of said second composition and third composition is added into a solution of said polymer first and then a mixture of said first composition and third composition is added thereinto.

33. The catalyst composition as claimed in claim 1, wherein said first composition, said second composition and said third composition are respectively added into a solution of said polymer at the same time or at random.

34. The catalyst composition as claimed in claim 1, wherein said first composition is present in an amount of 0.001 to 50 millimoles based on 100 g of said polymer.

35. The catalyst composition as claimed in claim 1, wherein said first composition is preferably present in an amount of 0.002 to 10 millimoles based on 100 g of said polymer.

36. The catalyst composition as claimed in claim 1, wherein a molar ratio of said second composition to said first composition is from 0.1 to 50.

37. The catalyst composition as claimed in claim 1, wherein one unit of said polymer has a molecular weight of 1,000 to 1,000,000.

\* \* \* \* \*